(12) United States Patent
Levy et al.

(10) Patent No.: US 6,192,890 B1
(45) Date of Patent: Feb. 27, 2001

(54) CHANGEABLE TATTOOS (76) Inventors: David H Levy, 16 Blake St., Cambridge, MA (US) 02140; John-Paul F. Cherry, 23 Oxford Ave.#2, Belmont, MA (US) 02478

( * ) Notice: Subject to any disclaimer, the term of this patent is extended or adjusted under 35 U.S.C. 154(b) by 0 days.

(21) Appl. No.: 09/280,496

(22) Filed: Mar. 30, 1999

Related U.S. Application Data (60) Provisional application No. 60/080,121, filed on Mar. 31, 1998.

(51) Int. Cl.[7] .................................................. A61B 19/00

(52) U.S. Cl. ............................................................. 128/899

(58) Field of Search ..................................... 128/897–899; 106/31.03, 31.15, 31.12, 31.33, 31.64, 31.65

(56) References Cited

U.S. PATENT DOCUMENTS 5,638,832 * 6/1997 Singer et al. ...................... 128/899
6,013,122 * 1/2000 Klitzmann et al. ............... 106/31.03

* cited by examiner

*Primary Examiner*—Samuel G. Gilbert (57) ABSTRACT

A changeable tattoo system with an electrically modifiable ink that includes biocompatible microspheres or particles encapsulated in a clear microsphere shell of diameter 30–150 microns. A hard overcoat is used to reduce deformation under loading from the skin. Tattoos are implanted with a novel tattoo needle with a flat or concave forward tip. A conformable set of drive electrodes is applied to the skin to manipulate the tattoo image using magnetic or electrophoretic techniques that include the use of an electrophetic backplane of the body's core capacitence. A capactive coupling electrode is used to establish this connection. Greyscale and color gradient images are created by calibrating the system before use and pulsing EM fields.

16 Claims, 7 Drawing Sheets

CHANGEABLE TATTOOS

This application is filed citing as reference provisional application Ser. No. 60/080,121 of the same name, filed Mar. 31, 1998.

FIELD OF THE INVENTION

This invention relates generally to tattoos that may be changed at will, and more specifically to an ink, method and devices to provide tattoos that may be readily changed to show any image, text or combination thereof.

BACKGROUND OF THE INVENTION

Tattoos are an ancient form of personal expression. They provide an image or text worn on the skin, impervious to washing, surface abrasion or time. Indeed, the tattoos are best known for their permanence. As a remedy to the inalterable permanence of the tattoo art, several technologies have recently become available that allow tattoos to be removed, but these processes are painful, expensive, and relatively slow, often requiring multiple treatments to achieve only moderate success. For this reason many people who are interested in personal expression and body art are dissuaded from getting a tattoo because of the inalterable nature of tattoos. Also, tattoos are currently provided by specialized tattoo parlors, adding to their cost and inaccessibility. There are temporary tattoos, but they are short-lived and relatively limited in the variety of possible images as they are manufactured in a finite set of popular likenesses.

It is therefore desirable to have the benefit of body art (tattoo) that would last indefinitely, yet could also be changed as desired. Ideally one could modify, completely change, or "remove" a tattoo quickly, painlessly and at low cost. Furthermore, it is desirable to allow the wearer to change the design to be a one-of-a-kind, self-made image, one that even reflects the subtleties of their own hand, as opposed to a second parties interpretation of their visual concept, or simply a manufactured popular image. It is also desirable to provide an "eraser" that allows a tattoo image to be easily removed. It is also desirable to have a low-cost device that would enable a tattoo-wearer to change their tattoo to represent any electronically stored image, such as available through the worldwide web. It is yet a further object to provide the above in such a way as to eliminate the need for especially skilled persons to create/change a tattoo image. It is yet still further object to provide means for a tattoo owner to apply the original tattoo themselves. Yet still further it is desirable to provide greyscale and color images in the above contexts. It is also the object of this patent to provide devices and tattoo inks that will facilitate the above. It is also desirable to have a changeable display for the human body which is optimally thin, flexible and durable. It is also desirable to provide a dynamic image on the skin which can also be used as a computer, video or informational display. In the case of animals, it is desirable to be able to permanently and painlessly mark and remark individuals to aid in their care and treatment. It is also desirable to be able to vary the markings on livestock and captured wild animals to keep track of their dates and places of capture, inoculations, medical history and the like.

PRIOR ART

U.S. Pat. No. 5,638,832 to Singer provides an LCD display that is surgically implanted under the skin. This device requires a local power source, which is invasive to the body and increases the risk of injury and/or the need for repair. It also requires the implantation of electronic circuitry, which us further undesirable for the reasons stated. The implantation of this device requires extensive surgery. This device (its electronics, battery and/or display) are also relatively rigid and relatively non-conformal, providing some awareness to the user of the presence of the device and increasing the risk of injury to internal tissues. Finally, it is inherent in the nature of scanned display technologies, such as LCD, to have potential failure points along entire lies and regions of the display. The inherent tradeoff between flexibility and durability renders these devices as being either susceptible to catastrophic damage by a single blow, or bulky and/or rigid.

The prior art describes many approaches for making microspheres of two colors, such as U.S. Pat. No. 5,344,594 to Sheridon in which two epoxy jets flow into one another to produce a solid sphere. There is also art U.S. Pat. No. 5,604,027 to Sheridon, that provides an encapsulated bi-colored microsphere that can be rotated with electric fields. U.S. Pat. No. 5,760,761 to Sheridon provides transparent and colored microspheres using varying zeta potentials. None of these patents provide or suggest: biocompatible microspheres in a resorbable biocompatible fluid; a removable print plane; using the body's core capacitance as an electrical reference; or using the dermis as a matrix, or changeable tattoos in general.

SUMMARY OF THE INVENTION

In this invention the above limitations are overcome and objects and advantages achieved as follows. In a broad sense, the instant invention is still a true tattoo: ink introduced into the inner dermis by insertion, preferably by a needle. However the instant invention does not use traditional tattoo inks nor the traditional tattoo needle, and is manipulated externally by novel tattoo image manipulation devices. The ink includes spherical microcapsules (30–150 $\mu$ diameter) made of a biocompatible transparent material which contains image material of at least two colors. In the preferred embodiment three sets of rotating ball microspheres are used, each set being independently controllable. Each set containing two colors and a transparent axis. By injecting an area of the skin with this ink in a continuous surface, the present invention provides the basis for a multi-colored changeable and removable tattoo. By applying an electric field the microspheres may be oriented to provide any desired image.

There are two primary embodiments which may be used for the microcapsules. The first has three elements: a transparent shell, a particulate and a fluid. The particulate is nonconductive, biocompatible, and of density compatible with the fluid. Suitable materials include polyethylene pigmented with magnetite, or polyurethane dyed organically with carboxy functional groups throughout, and can be readily purchased from companies like Dyno Particles AS as microspheres as small as 0.5 microns. The fluid must be nonconductive, opaque, biocompatible, and of density compatible with the particulate, such as poly(dimethylsixone). Powdered titanium dioxide alone or pigmented into plastic particles is used to color silicone oil. The shell must be nonconductive and biocompatible, with sufficient structural integrity to withstand the implantation process. In one embodiment this structural integrity is achieved by a secondary manufacturing operation that adds a rigid-walled transparent outer shell over a transparent primary shell. In another embodiment the first shell is made of a semicrystalline or amorphous state of collagen called gelatin with a high number of cross links, thereby offering a clear, nonabsorbable highly biocompatible material with a structural integrity near that of glass. The outer spheres could also be made of many different type of polymers which include: polystyrene, polypropylene, polyamides, polyolefins, or acrylics. Particularly suitable polymers include polycarbonate and polysulfone because of their low water absorption, high stability, low water permeability and low bioactivity. The process of making microspheres with encapsulants is know in the art. In one embodiment microencapsulation by interfacial polymerization is used to encapsulate droplets of oil containing the inner spheres with an outer shell of a polymer. This polymer could be: polyurethane, polyethylene, polypropylene or another polymer with suitable characteristics for use in an interfacial solution.

The second structure is a biocompatible colored sphere floating in a transparent biocompatible fluid that is itself contained within a transparent biocompatible shell. The sphere is rotated (using electric or magnetic fields) to control the color presented at the skin surface. A variety of colors may be provided using gyricon techniques known in the art. Again, many microcapsules together form a single pixel. The preferred fluid is a silicone oil such as poly (dimethylsixone). There is a great deal of art on the manufacture of colored spheres. However, in this application and within this embodiment, it is critical to have a transparent shell with structural rigidity because the manufacturing process yields an extremely small gap between the inner bi-colored sphere and the transparent outer shell. Therefore small deflections of the outer shell, such as provided by the inherent asymmetric forces within the dermal tissue can cause the inner sphere to contact the shell and not rotate. A rigid outer shell that addresses this problem is manufactured by placing encapsulant microspheres into a flow into which is added a second flow of epoxy, coating the microspheres. The uncured, coated microspheres are separated by sonification and placed into a curing agent, producing an encapsulated microsphere with a hardened overcoat. An ultraviolet or laser cure may also be used. This hard shell also enables implantation of the microspheres with minimal rupture, as mentioned above.

In the preferred embodiment, one axis of an inner sphere is transparent. Transparency allows for the "removal" of the tattoo by allowing the wearers skin color to show through. Transparency also allows many colors to be shown by selectively turning classes of microspheres to be transparent or to show simultaneously, despite the random superposition of adjacent microspheres.

The instant invention provides the desired ultimately thin and flexible means of providing a changeable tattoo. And, because of the high degree of redundancy and complete autonomous nature of each component, it also provides an extremely high resistance to failure.

The instant invention includes several novel means to apply changeable tattoos. Rather than use the existing pointed and solid tattoo needle, the present invention uses a concave tip that entraps microspheres and carries them to their rest position. Another embodiment uses a hypodermic type needle. To ease the application process multiple layers of microcapsules are attached to a carrier patch that holds the microcapsules in the shape of the desired tattoo region. To apply the tattoo, the carrier patch is placed in the desired location and held in place by a temporary adhesive. An oscillating needle is traversed back and forth over the surface of the patch, displacing microcapsules from the carrier patch into the dermis. Because the needle visibly discolors the patch, it is easy to identify which regions of the carrier have been "needled" and which not. Because this process is unskilled, it can be done by relatively untrained persons, much as ear piercings are today. An anaesthetic may be added to the patch so that it numbs the area prior to ink insertion. Another such procedure is to abrade or dermatome the region and then directly apply the ink as a paste, allowing the site to heal, thereby creating a changeable tattoo. In another embodiment, the tattoo is preformed into a compliant sheet of a resorbable matrix and slid into place under the skin, a procedure that must be performed by a trained person.

The instant invention also includes two devices that may be used to change a tattoo image. The first is a stylus device that produces a localized field effect with which the user may create or modify a tattoo image, much as he or she would by writing with a pen. The preferred stylus device provides an electric field and includes a first electrode, coated with a high-dielectric material, located at the tip of the stylus and a second electrode that is comprised of the core of the body itself. In this embodiment a coupling (capacitive or resistive) is made to the core capacitance of the highly conductive materials that constitute the majority of the body (that lay beneath the dermis) allowing the body core to act as one side of an electrophoretic plate, with the stylus providing the other half of that signal. By varying the frequency of the field strength, the user may control the color intensity and by varying the effective size of the tip electrode, the width. In the magnetic field implementation, a coil is disposed at the tip to modulate the region directly beneath stylus. By manipulating the stylus, the user passes a localized field through the tattoo material and manipulates the image at will.

The second class of tattoo manipulation device includes a large surface area print head, a matrix of EM field drivers placed temporarily over the tattoo to operate all the pixels in order to recreate an electronically stored image onto the skin. There are two embodiments of the printer disclosed. The electric field device includes a top plane element that consists of a matrix of independently driven electrodes and a back plane element comprised of the core of the human body, which has been capacitively or resistively coupled to a fixed electrical potential with respect to the matrix electrode. In the preferred embodiment, the top plane is flexible, so that it may conform to the body part and provide a non-distorted tattoo reproduction of the stored image. The magnetic field device includes a large plurality of loops of coils. Either embodiment may be replaced by a single EM field driver that is driven in two axes to replicate a large area print head. Incorporating a color scanning technology with a feedback loop increases color resolution.

Gradations of color may be implemented with approaches that may be used independently, or in concert. The first is to provide the individual particles which comprise the whole with a range of mass-to-charge ratios. Increased mass decreases rate of particle movement within a field and increased charge density increases it. By allowing, or augmenting, the range of the mass-to-charge ratio that naturally occurs in the manufacturing process, fields of constant force will motivate particulates at different rates, allowing for different dispersion of particulate in the fluid and thereby differing levels of color at the surface. A calibration mode must be used to adjust the field intensity to accommodate viscosity variation in the fluid from age, manufacture and temperature. Florescent tattoos are provided by encapsulating selectively fluorescing dyes or proteins such as those developed from jelly fish.

The instant invention includes several improvements to common electronic devices that provide novel applications for use with changeable tattoos such that the tattoos may be used as an information storage and display device. Specifically, in the instant invention a changeable tattoo print head is disposed onto an external surface of a computation and or communication devices (hereafter CCD) such as telephone, computer and/or personal digital assistant. This print head is addressable by the microprocessing unit within the CCD, allowing it to rewrite tattoos on demand, controllable by software within the CCD. The user may display any information contained within (or provided by) the CCD on the information storage and display device on the body. No batteries are required to store and display this information indefinitely. Examples of desirable locations for such a display are the hand or forearm. Directions, phone numbers, appointments, daily schedules, reminders, etc, may be temporarily transferred to the tattoo display device through the CCD. One such example is for a printer on the back of an electronic daily planner to update the information on the user's hand as the day progresses. Voice recognition technology in the device provides the ability to write directly to one's body with verbal command.

In one embodiment transparent sheets include a conductive transparent matrix, such as indium tin oxide, covers the skin, allowing the tattoo image to be dynamically modified as it is being viewed. Control electronics drive local field variations according to a video input signal providing a computer, TV or informational display on the skin.

DETAILED DESCRIPTION

Figure 1:
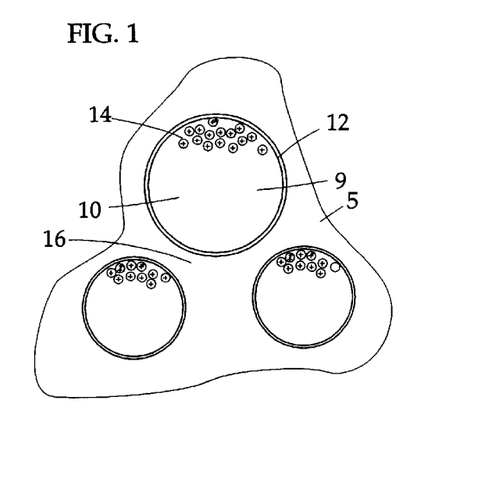
FIG. 1 shows a tattoo ink for changeable tattoos including a biocompatible encapsulant microspheres and a biocompatible suspension.

FIG. 1 shows a tattoo ink 5 for changeable tattoos 7 with biocompatible encapsulant microspheres 9 and a biocompatible suspension 16. Encapsulant microspheres 9 are made with a transparent biocompatible spherical shell 12 of diameter between 30–150 microns that contains an opaque non-conductive biocompatible fluid 10. Biocompatible opaque non-conductive particulate 14 contains an electric or magnetic charge. An electric charge is preferred to provide a tattoo that is more stable in a common urban environment, with its variety of magnetic fluxes. Implementation of an electric field device is first described: By placing an electric field along the vertical axis of the encapsulant microspheres 9 the particulate 14 may be transferred to the top or bottom of the shells 12. As drawn, the particulate 14 is viewable by a person located at the top of the page, therefore the ink 5 will appear the color of the particulate 14. If the particulate were to be drawn to the bottom of the shells 12, then the ink 5 would appear the color of the fluid 10 when viewed from the same location. Fluid 10 may be made of poly (dimethylsixone with a colorant, such as titanium dioxide. Shell 12 may be made of long chain polymer materials such as polyolefin, chlorinated xylene polymer, gelatin-gum arabic, polyurethane, polyethylene, polypropylene. Other polymers with suitable characteristics for use in an interfacial solution may be used. Biocompatible suspension 16 lubricates encapsulant microspheres 9 during the insertion process and may be made from an equal mixture of glycerin and water. Shell 12 can be rigidified using a UV or laser curable compound.

In one embodiment an intermediate intensity of color is provided by having particulate 14 comprised of components with varying amount of charge. Force applied to any given particle is proportional to the number of charges on that particle. By calibrating the field intensity to the viscosity and range of charge values, particulate of a given charge quantity may placed at a desired height within the sphere, thereby presenting a graduated color. This procedure is enhanced by oscillating the field during electrophoresis at a high frequency superimposed upon the desired steady state value. The oscillation provides a randomizing effect that jostles particles free of entrapment by their neighbors, easing movement within the microspheres 9.

Note: biocompatible is defined as acceptable to regulatory agencies to be implanted within the human body as described herein.

One method of implantation is to remove the dermal-epidermal junction 20 by abrasion or cutting, such as with a dermatome, and then apply the encapsulant microspheres 9 directly. This method of implantation may be used with any embodiment of the encapsulant microspheres 9 disclosed.

Figure 2:
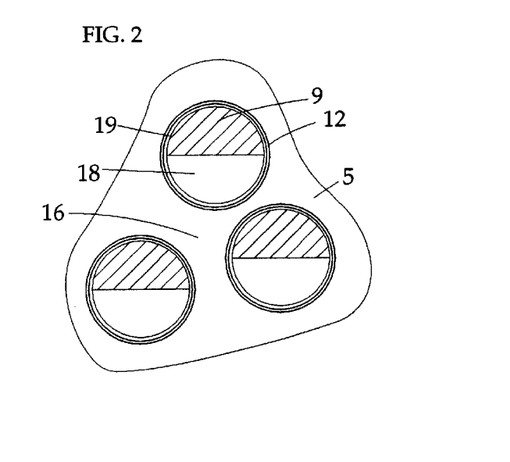
FIG. 2 shows an embodiment in which a bi-colored sphere floats in a transparent silicone oil within a transparent biocompatible spherical shell.

FIG. 2 shows an embodiment of encapsulant microspheres 9 in which a bi-colored sphere 18 floats in a transparent silicone oil 19 within a transparent biocompatible spherical shell 12. In this structure, the changing field has the effect of rotating the sphere by placing force on a dipole charge to show the desired half of the bi-colored sphere 18. Other sphere structures, such as in FIG. 21 may be used. Biocompatible suspension 16 is provided as above.

Figure 3:
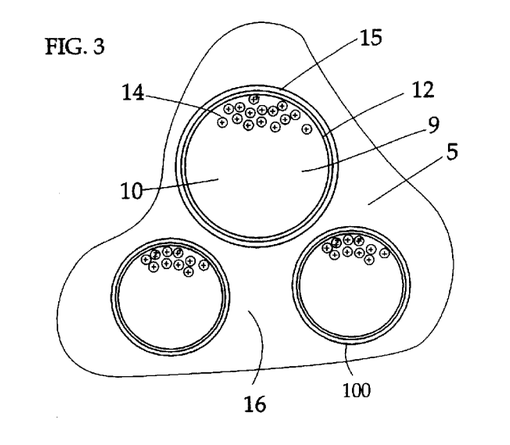
FIG. 3 shows the embodiment of FIG. 1 with a rigid clear overcoat.

FIG. 3 shows the embodiment of FIG. I with a rigid clear overcoat 15. Overcoat 15 increased the survival rate of the encapsulant microspheres 9 as they are inserted into the body. Because a larger number of microspheres 9 survive the insertion process, a lower amount of overshot is needed. Overcoat 15 also decreases the rate of hydrolysis, thereby increasing the longevity of the changeable tattoo within the body. The end product is rigidized encapsulant 100, a sphere made rigid with a second protective, hardened, clear overcoat 15 over the shell 12.

Figure 4:
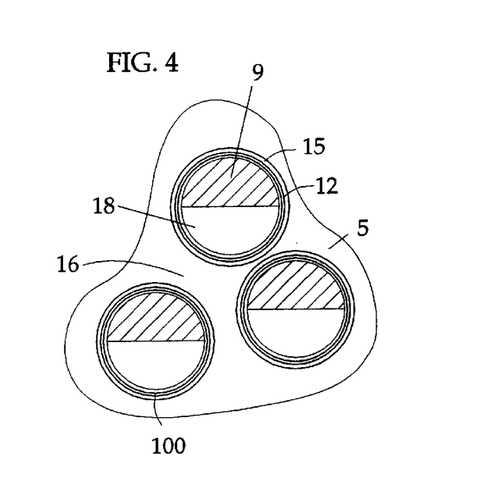
FIG. 4 shows the embodiment of FIG. 2 with a rigid clear overcoat.

FIG. 4 shows the embodiment of FIG. 2 with a rigid clear overcoat 15. Because the manufacturing process leaves an extremely small gap between the bi-colored sphere 18 and the inner surface of the shell 12, small deformations in the shell 12 are capable of causing the two to contact and preventing rotation of the sphere 18. Therefore, the overcoat 15 has greater importance to the rotary embodiment (FIG. 2) than the lateral translation embodiment (FIG. 1).

Figure 5:
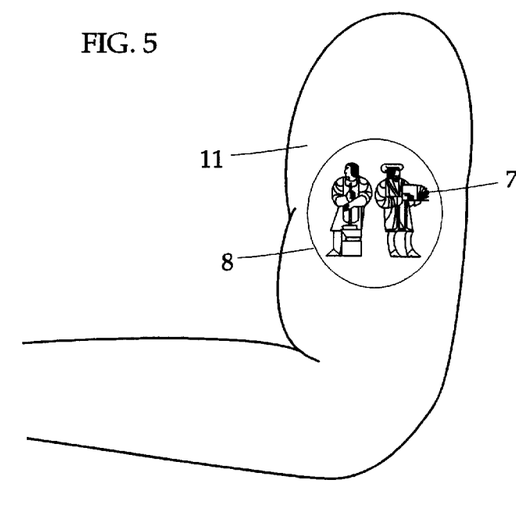
FIG. 5 shows a changeable tattoo (an example image of two men) on an arm.

FIG. 5 shows a changeable tattoo 7 (an example image of two men) on an arm 11. The border 8 defines the edge. The entire area within the border 8 is injected with encapsulant microspheres 9 providing an area that may display a permanent tattoo image that may also be changed at will using the techniques described herein.

Figure 6:
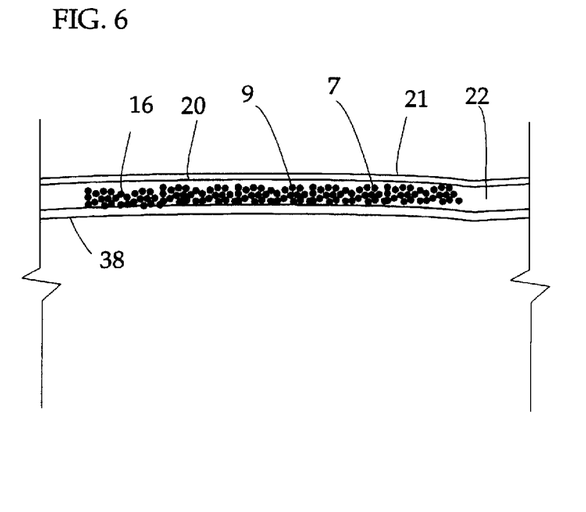
FIG. 6 shows a large plurality of encapsulant microspheres inserted below the dermal-epidermal junction, forming a changeable tattoo.

FIG. 6 shows a large plurality of encapsulant microspheres 9 inserted below the epidermis 21, in the inner dermis 22 of the arm of a user below the dermal-epidermal junction 20, forming a changeable tattoo 7. (Note: The dermal-epidermal junction 20 is drawn schematically as a straight line, while it is actually an undulating surface.) The high degree of redundancy offers high reliability. The mechanical independence of the spheres relative to each other offer both conformability to any body contour and truly flexibility in two axes. If a few spheres are broken, it will not be noticed. Biocompatible suspension 16 is absorbed by the body resulting in encapsulant microspheres 9 being stabilized by the collagen and reticular matrix of the inner dermis 22. Differing from a traditional tattoo, the objective is to cover the region in a continuous region of ink.

Figure 9:
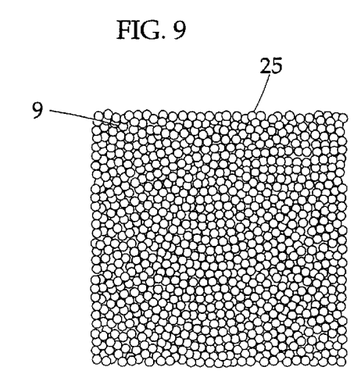
FIG. 9 shows encapsulant microspheres manufactured permanently into an elastomeric support matrix for surgical emplacement.

Four basic methods are disclosed for introducing encapsulant microspheres 9 into the body as shown in this figure. The first two use a needle, shown in FIGS. 7a and 7b. The third is to cut a slit in the skin and slide in a patch 25 that consists of microspheres 9 and a temporary binder, of a biodegradable material such as that holds microspheres 9 into a desired shape, as shown in FIG. 9. The forth is to remove the upper dermis completely as with a dermatome and then apply microspheres 9 in bulk to the surface and then allow the skin to heal over the wound site.

Figure 7A:
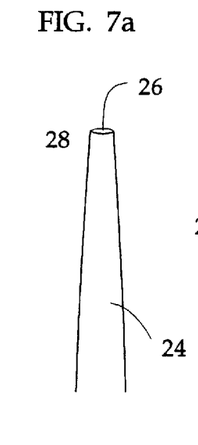
FIG. 7a shows a convex needle for applying changeable tattoos.
Figure 7B:
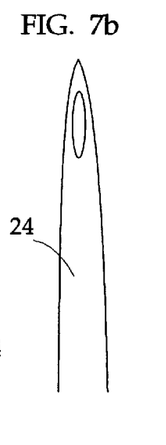
FIG. 7b shows a hypodermic tattoo needle.
Figure 8:
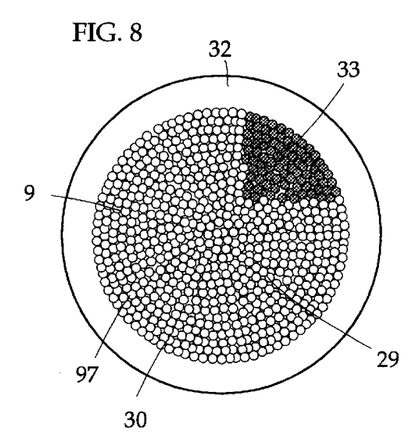
FIG. 8 shows encapsulant microspheres manufactured as a carrier patch.

FIG. 7a shows a needle 24 for applying changeable tattoos 7. The tip 28 has a face 26 with a flat or concave surface with diameter of approximately 50 microns. The face 26 improves the ability for the needle 24 to deliver encapsulant microspheres 9 from the skin surface to the inner dermis 22. The procedure is to apply the free-flowing tattoo ink 5 to the surface of the skin and then insert the needle 24, thereby introducing encapsulant microspheres 9 into the inner dermis 22. Alternately, instead of free-flowing tattoo ink 5, ink may be applied with tattoo carrier patch 29 as shown in FIG. 8. FIG. 7b shows a hypodermic tattoo needle 27.

FIG. 8 shows encapsulant microspheres 9 manufactured as a carrier patch 29. Binder 30 holds the encapsulant microspheres 9 temporarily, and in the shape of the changeable tattoo 7 desired. Gelatin with a low degree of cross linking is a preferred material. Flange 32 extends beyond the border 8 and is taped to the body in the location where the changeable tattoo 7 is desired. Flange 32 may have an adhesive. Encapsulant microspheres 9 are then inserted into the body using standard tattoo techniques. Areas that have been "needled" are discolored as shown by finished area 33. An anaesthetic 97 may be incorporated into carrier patch 29.

FIG. 9 shows encapsulant microspheres 9 manufactured permanently into an elastomeric support matrix 25 for surgical emplacement. This embodiment is slid into a cut in the skin in one piece. The material of the support matrix 25 shown here is the bioaborbable material poly-alpha-hydroxy acid (polyglycolide or polyactide), although other absorbable materials may be used.

Figure 10:
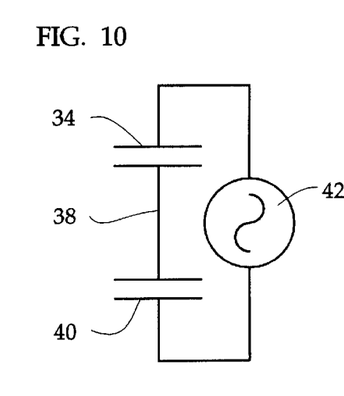
FIG. 10 shows an electrical model of the circuit necessary to create an electric field embodiment of a changeable tattoo.

FIG. 10 shows an electrical model of the circuit necessary to create an electric field embodiment of a changeable tattoo 7. The system may be modelled as two capacitors in series with a driven signal. The body's core capacitance 38 couples with a ground coupler 40 and the individual field drivers 34. A signal 42 is controlled through a processor 36. One such arrangement is diagrammed in FIG. 11 which shows ground coupler 40 located at a random coupling site on the body 51.

Figure 11:
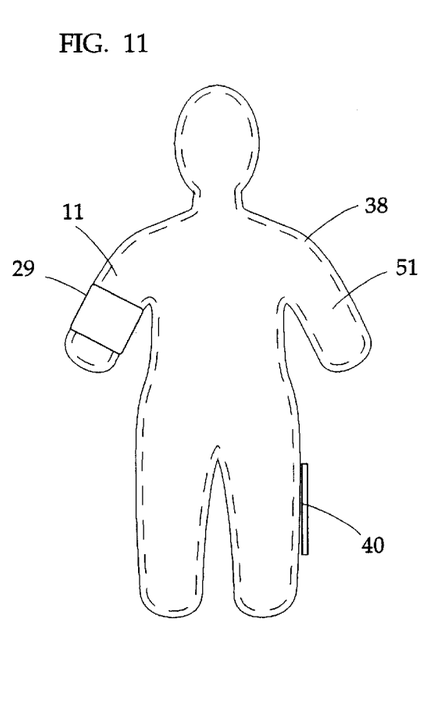
FIG. 11 shows a human figure with a ground coupler coupling with the body's core capacitance.

FIG. 11 shows a human figure with a ground coupler 40 coupling with the body's core capacitance 38. The core capacitance of the body 38 is comprised of the highly conductive material inside the arm 11 below the dermal epidermal junction 21.

Figure 12:
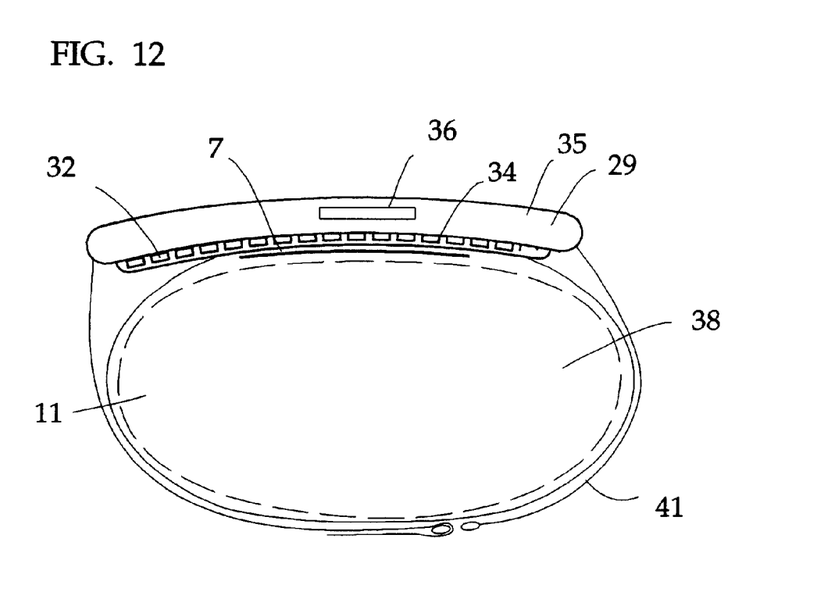
FIG. 12 shows cross sectional view of a changeable tattoo changing device for changing changeable tattoos attached to an arm.

FIG. 12 shows a changeable tattoo changing device 29 for changing changeable tattoos 7 attached to part of a body 51 such as an arm 11. The housing 35 contains a print head 32 disposed at an outer surface consisting of a two-dimensional matrix of field drivers 34 that may be individually controlled by the processor 36.

To control ink 5 that is magnetically driven, each field driver 34 consists of a loop or coil of conductive material with primary axis orthogonal with changeable tattoo 7. Changeable tattoo 7 is located within the surface are of print head 32 and by individually modulating the fields at each field drivers 34 any image may be placed onto the arm 11, or other place on the body, as a permanent tattoo. Field drivers 34 may be differentially driven in concert to produce and/or control fringe effects.

For ink 5 manufactured to operate with electrical fields, manipulation is done electrophoretically with each field driver 34 consisting of an electrode. The body's core capacitance 38 is used as the ground plane (electrophoretic reference plane) by coupling to the body 51 at any convenient location, such as an arm or foot. The coupling to the body is done with techniques known in the art. The body's core capacitance 38 and print head 32 are used to create an electrophoretic signal across the lower dermis that may be used to operate electrically-driven ink 5. There are two significant advantages to using the body's core capacitance 38 to provide one side of the electrophoretic field as opposed to orienting a second plate on the opposite side of the body member being worked on. The first is that the field strength may be substantially lower because the distance traversed by the field is far less. This increases the margin for safety and yet provides a high-speed tattoo change. The second is that the accuracy of the image is enhanced because the body's core capacitance 38 automatically compensates for curvatures (or lack thereof) between the two field-producing "plates."

A strap 41 made of mechanical loop fastening material holds the device 29 to the arm 11.

Figure 13:
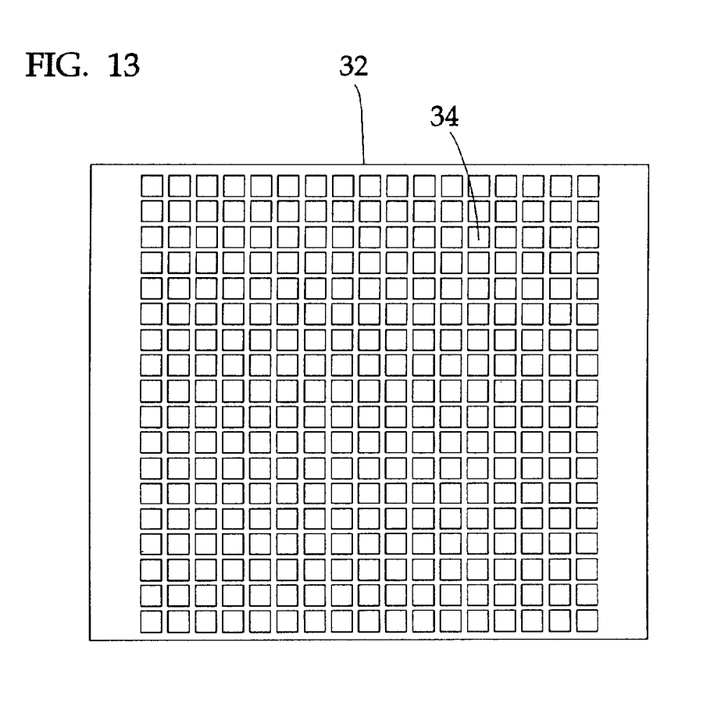
FIG. 13 shows a plan view of the print head with field drivers.

FIG. 13 shows a plan view of the print head 32 with field drivers 34. Alternately, a single field driver may be used if it is mounted to an XY plot-type mechanism or a linear array driven along one axis. Single axis units have the advantage of being able to produce canted fields by flexing the skin with rollers. The plane that connects each electrode to a common point is not shown, but known in the art.

Figure 14:
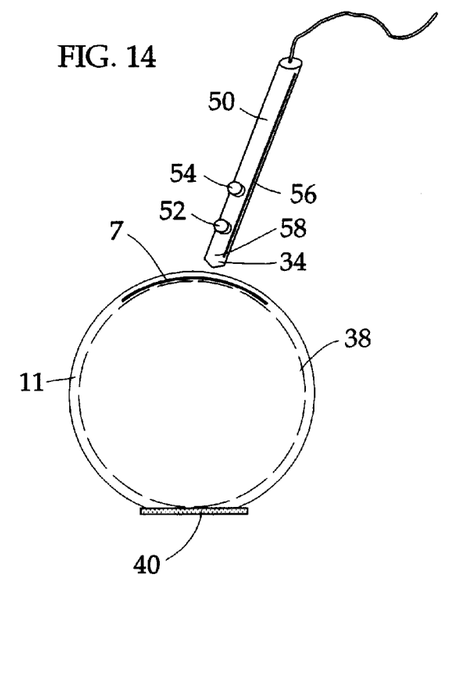
FIG. 14 shows a stylus device for hand-drawing changeable tattoos.

FIG. 14 shows a stylus device 50 for hand-drawing changeable tattoos 7. For ink 5 that is electric-field activated, ground coupler 40 provides a reference plane for an electrophoretic field through coupling with the body's core capacitance 38 and field driver 34, comprised of an electrode, is disposed at the end 58 provides the drive signal. The darkness of line is dependent on speed of stroke when the field strength is reduced to compensate for temperature, viscosity and charge density. This compensation is provided by darkness control 54. Width control 52 provides an adjustment for the width of the line by varying field drivers 34. An eraser 56 is comprised of an electrode elongated along the length of the device 50, allowing the entire tattoo 7 to be erased with one stroke. A magnetic field embodiment uses a loop or coil instead of an electrode for field driver 34.

Figure 15:
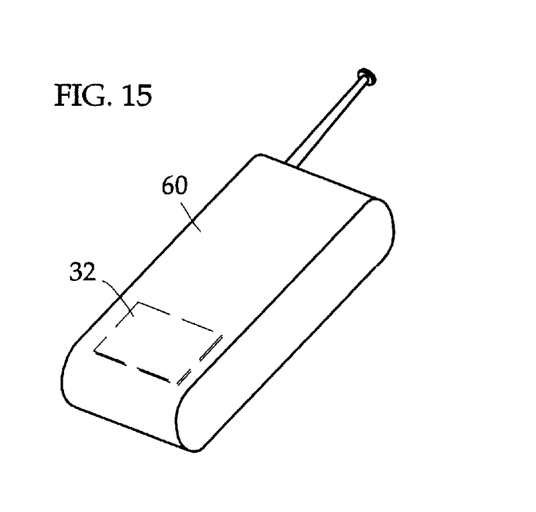
FIG. 15 shows the back of a personal digital assistant with communication capabilities.

FIG. 15 shows the back of a personal digital assistant with communication capabilities 60. A printer head 32 is disposed on the rear of the PDA 60 within the shell of the case.

Figure 16:
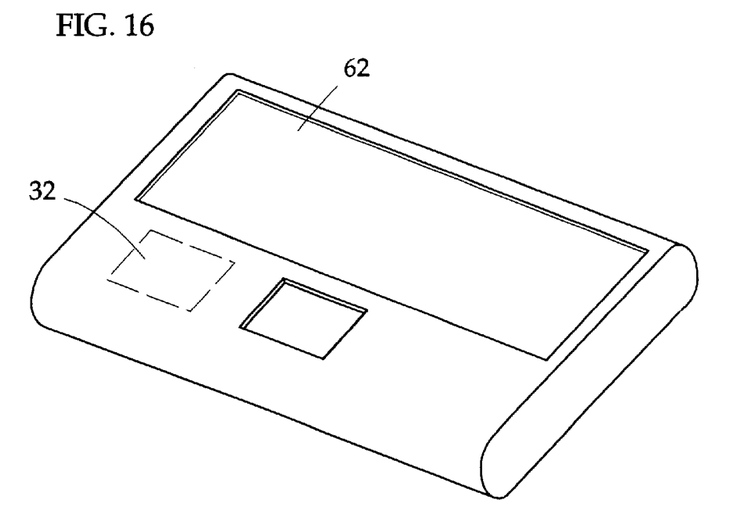
FIG. 16 shows a portable computer with a printer head disposed within the shell of the case.

FIG. 16 shows a portable computer 62 with a printer head 32 disposed within the shell of the case.

Figure 17:
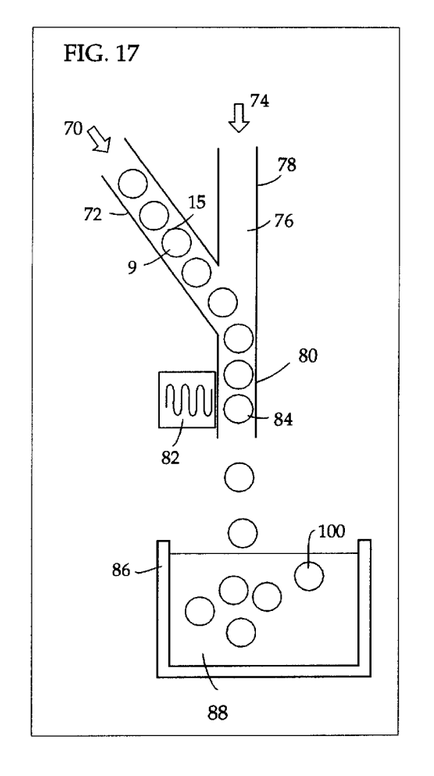
FIG. 17 shows a manufacturing method for producing a rigidized encapsulant microspheres in batches.

FIG. 17 shows a manufacturing method for producing a rigid clear overcoat 15 on encapsulant microspheres 9 in batches. A first flow 70 includes encapsulant microspheres 9 in a first channel 72. A second flow 74 includes a fluidized hard coat material 76 (such as EPO Tek 301-2) in a second channel 78. Flow through first channel 72 is not limited to diameters that allow the passage of a single encapsulant microspheres 9 at a time. First flow 70 and second flow 74 are joined in a third channel 80. A sonication device 82 vibrates third channel 80 and causes coated uncured microspheres 84 to separate from other microspheres 84. Fluidized hard coat material 76 is then hardened. In one embodiment coated uncured microspheres 84 fall into a vat 86 filled with a curing agent 88 (such as RF 91 by Resin Formulators Co., Culver City, Calif.). Once cured, encapsulant microspheres 9 have been converted to the embodiment shown in FIGS. 3 and 4, rigidized encapsulant 100.

Figure 18:
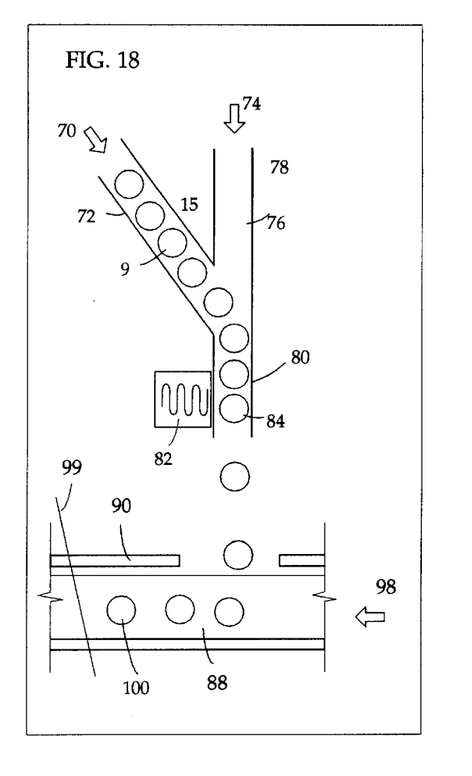
FIG. 18 shows a manufacturing method for producing a rigidized encapsulant microspheres in a continuous process.

FIG. 18 shows a manufacturing method for producing rigidized encapsulant 100 in a continuous process. The vat 86 has been replaced with a forth channel 90 which directs a third flow 98 of curing agent 88. Filter 99 removes rigidized encapsulant 100 from the third flow 98.

Figure 19:
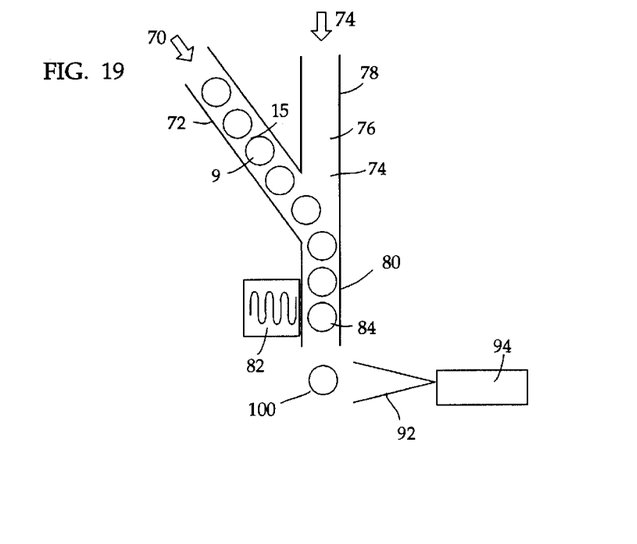
FIG. 19 shows a manufacturing method for producing a rigidized encapsulant microspheres in a continuous process with light.

FIG. 19 shows a manufacturing method for producing a rigidized encapsulant 100 in a continuous process using transmitted energy as a curing agent. Light 92 from an ultraviolet generator 94 is projected onto coated uncured microspheres 84.

Figure 20:
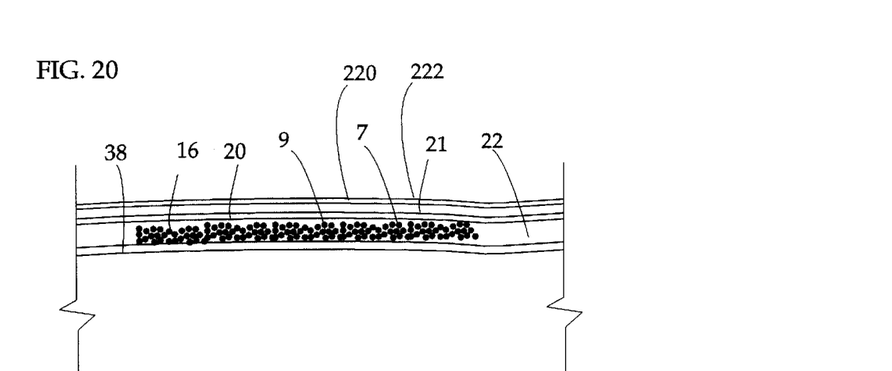
FIG. 20 shows a dynamically active tattoo in the skin of a wearer.

FIG. 20 shows a large plurality of encapsulant microspheres 9 inserted below the epidermis 21, in the inner dermis 22 of the arm of a user, below the dermal-epidermal junction 20, forming a changeable tattoo 7. A matrix of transparent electrodes 220 is embedded in a transparent flexible material 222 such as a nylon mesh or polyethylene wrap to provide the field drivers 34 and the functionality of print head 32, allowing Tattoo 7 to be dynamically changed to provide an active display for computer, video, or informational images.

Figure 21:
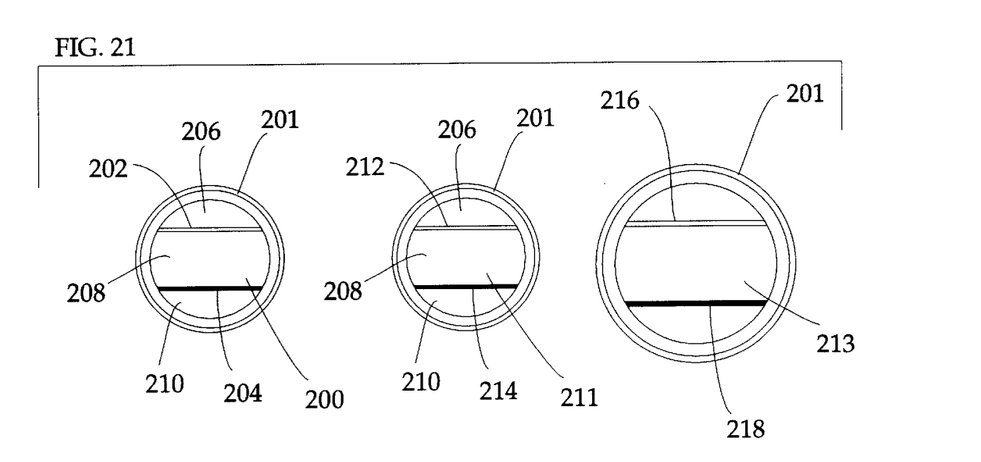
FIG. 21 shows the configuration of microspheres for RGB images with white, black and customized highlights.

FIG. 21 shows representatives of three types of microspheres that together make an full color (RGB) changeable and removable tattoo image, with white, black and custom highlights. Each type consists of two opaque colored planes sandwiched between three transparent areas. Techniques to make such microspheres are known in the art. By using two threshold field potentials and two diameters of spheres, each of the three sets of balls may be independently manipulated. A first microsphere 200 has a red layer 202 and a customized highlight layer 204 such as a neon green, or a phosphorescent (glow-in-the-dark) material separated by transparent layers 206, 208, 210. A second microsphere 211 has a blue layer 212 and a white layer 214 separated by transparent layers 206, 208, 210. A third microsphere 213 has a green layer 216 and a black layer 218 separated by transparent layers 206, 208, 210. The diameter of at least one type is different from the other types (here third microsphere 213) to provide a level of selectivity beyond that provided by having different zeta potentials alone.

While particular embodiments of the particular invention have been shown and described, it will be obvious to those skilled in the art that changes and modifications may be made without departing from this invention in its broader aspects.

What is claimed is:

1. An implanted body image system to provide a changeable tattoo on a skin area of a user including:
   biocompatible particulate adapted to be implanted into said skin area of a person or animal, said biocompatible particulate to include at least two color states, said color states to be selectable by imposed electromagnetic fields.

2. The implanted body image system of claim 1 enabled by:
   a skin print device, said skin print device including a plurality of field production nodes, said nodes distributed in a matrix and said nodes producing fields selected from the group consisting of electric, magnetic and electromagnetic.

3. The implanted body image system of claim 1 enabled by a coupling electrode, said coupling electrode adapted to provide a backplane for the creation of electric fields across the dermis of a user.

4. The implanted body image system of claim 1 enabled by a processor operatively coupled to a matrix of field-producing drivers, each ones of said matrix disposed in a predominantly planar orientation such that said matrix may be temporarily placed against skin of a user in face-to-face contact with said tattoo display as a means to alter an image shown by said changeable tattoo.

5. The implanted body image system of claim 1 further including a drive matrix diposed distal to said particulate.

6. The implanted body image system of claim 5 wherein said drive matrix is disposed on a transparent substrate.

7. The implanted body image system of claim 1 wherein said particulate is comprised of microspheres that contain at least a first pigment or dye and at least one additional distinctly different pigment or dye wherein at least two colors may be displayed selectively.

8. A tattoo ink including a large plurality of particles in which individual ones of said large plurality include a first pigment or dye and at least one additional distinctly different pigment or dye wherein at least two colors may be displayed selectively by ones of said large plurality, said at least two colors selected from the group consisting of said first pigment or dye and said at least one additional distinctly different pigment or dye.

9. The tattoo ink of claim 8 wherein groupings of adjacent individual ones of said large plurality display a different color which can be selected and reselected over time, such that an Nth composite image comprised of a tattoo comprised of said tattoo ink may be repeatedly altered to render an (N+1)th composite image.

10. The tattoo ink of claim 8 wherein a color presented by said tattoo ink is altered by exposure to energy selected from the group consisting of electrical, magnetic, and electromagnetic energy.

11. The tattoo ink of claim 8 wherein a first element colored by said first pigment or dye is displaced, from a first quasi-stable orientation to a second quasi-stable orientation, relative to a stationary encapsulant, thereby displaying said at least one additional distinctly different pigment or dye.

12. A device to alter a tattoo image disposed within a skin region of a person including:

a housing disposed external to said person;

a matrix of field-producing drivers disposed with said housing, each ones of said matrix disposed in a predominantly planar orientation such that said matrix may be temporarily placed in face-to-face contact with said tattoo image; and a matrix control means to selectively control fields produced by said matrix.

13. The device of claim 12 wherein said matrix control means includes a processor disposed within said housing.

14. The device of claim 12 further including a reference electrode.

15. The device of claim 14 wherein said reference electrode is adapted to be disposed on said person.

16. The device of claim 15 wherein said reference electrode is disposed outside a boundary defined by said matrix.

* * * * *